United States Patent [19]
Pearson

[11] 3,883,462
[45] May 13, 1975

[54] NOVEL RESINOUS COMPOSITIONS COMPRISING SEQUENTIAL REACTION PRODUCT OF FORMALDEHYDE, INORGANIC ACID, TRIETHANOLAMINE AND UREA

[76] Inventor: Glenn A. Pearson, 1311 Delaware Ave. S.W., Washington, D.C. 20024

[22] Filed: Jan. 16, 1973

[21] Appl. No.: 324,156

[52] U.S. Cl......... 260/29.4 R; 117/143 A; 117/148; 260/17.3; 260/37 M; 260/37 N; 260/70 M; 260/849; 260/850
[51] Int. Cl............................................ C08g 9/10
[58] Field of Search .......... 260/70 R, 70 M, 29.4 R

*Primary Examiner*—Howard E. Schain
*Attorney, Agent, or Firm*—Lowe, King & Price

[57] ABSTRACT

A method of preparing a resinous system, and the resinous system produced by the method is described whereby 30 moles of formaldehyde, 2 moles catalyzing acid, 2 moles triethanolamine, and 12 moles of urea are sequentially reacted to provide an aqueous resinous solution. The resinous solution will cure at room temperature or upon application of heat, permitting its use as or in coatings, adhesives, and the like.

5 Claims, No Drawings

NOVEL RESINOUS COMPOSITIONS COMPRISING SEQUENTIAL REACTION PRODUCT OF FORMALDEHYDE, INORGANIC ACID, TRIETHANOLAMINE AND UREA

FIELD OF INVENTION AND PRIOR ART

This application is related to my copending application Ser. Nos. 324,157 and 324,158 both now abandoned and is a continuation-in-part of Ser. No. 224,250, filed Feb. 7, 1972, now abandoned, which in turn is a continuation of Ser. No. 109,035, filed Jan. 22, 1971, now abandoned, which was a continuation of Ser. No. 763,981, filed Sept. 30, 1968 and now abandoned.

The present invention relates to resinous systems. More particularly, it relates to novel urea-formaldehyde resinous systems whereby aqueous formaldehyde, a catalyzing acid, triethanolamine, and urea are sequentially reacted in select proportions to yield an aqueous resinous composition providing unique properties and/or characteristics when employed as or in coatings, adhesives, and permanent-press or wrinkle-resistant finishes on textiles.

Urea-formaldehyde resinous systems are well known in the art for use in various applications. Moreover, various modifications to such resinous systems have been described in the literature including the coreaction of the formaldehyde and urea with triethanolamine. Further, techniques have been devised to provide formaldehyde-urea resinous systems which are water soluble. However, in the prior art systems the control of the reaction is difficult, apparently due to the high reactivity of the formaldehyde and urea leading to varying degrees of non-uniformity of the resinous system from batch to batch. To obtain water-soluble resinous systems, relatively complex techniques of acidification and neutralization are necessary. These techniques again lead to non-uniform resinous systems which often provide cured products with deficiencies.

OBJECTS OF THE INVENTION

Accordingly, it is a primary object of the present invention to provide a controllable method of producing a urea-formaldehyde resin.

It is another object of this invention to provide a simplified method of producing water-soluble urea-formaldehyde resinous systems having consistent uniformity from batch to batch.

It is another object of this invention to provide an aqueous resinous system which is compatible with various additives, permitting modification of the system to meet the requirements of various diverse applications.

It is another object of this invention to provide an aqueous resinous system which is air or heat curable to a tough, clear, insoluble, and infusible coating.

It is another object of this invention to provide an aqueous resinous system which is air or heat curable and which has a high degree of flame retardancy.

It is another object of this invention to provide an aqueous resinous system which has excellent adhesive properties.

It is another object of this invention to provide an aqueous resinous system which is air or heat curable to a tough, colorless, insoluble, and infusible resin, and which is completely compatible with textile fabrics permitting its use as a permanent-press or wrinkle-resistant finish.

These and other objects of the present invention will be more readily apparent from the following detailed description.

THE INVENTION

The aforesaid objects of the present invention are accomplished by the sequential reaction of formaldehyde, catalyzing acid, triethanolamine, and urea in select proportions. The proportions are 30 moles of aqueous formaldehyde, preferably 37 to 40 percent non-volatile; 2 moles of catalyzing acid, preferably phosphoric acid at 85 percent non-volatile; 2 moles of triethanolamine, and 12 moles of urea. It is critical that the ratios of each of the aforesaid reactants do not vary more than by about 15 percent from the stated amount. If the ratios deviate from the aforesaid stated amount by more than about 15 percent, the unique properties of the polymer are not obtained. Moreover, the sequential addition, and/or reaction of the reactants is critical. The reaction of formaldehyde and catalyzing acid is exothermic and occurs substantially immediately upon the mixing of the two reactants. Apparently the catalyzing acid-formaldehyde reaction medium acts as a diluent for the reaction between the triethanolamine and catalyzing acid-formaldehyde reaction product leading to substantially immediate and complete exothermic reaction. Urea, which is added last, reacts consistently at the same reaction sites, believed to be with the hydroxyl groups of the triethanolamine and residual hydroxyl groups formed by the excess formaldehyde. The reaction proceeds smoothly and is extremely rapid to provide a viscous, syrupy, water-white, aqueous, resinous solution. The resinous solution is stable at room temperature and remains stable when stored in bulk without substantial increase in viscosity for prolonged periods, i.e., up to about six weeks or longer. However, when the solution is applied as a thin film and/or as a casting, preferably with the addition of catalyzing materials, it will air cure or cure with application of heat to a water-white, insoluble, and infusible plastic. Although it is not intended to be limited by any theoretical explanation, it is believed that by using the designated ratios, and through the sequential steps of reactions a three-dimensional cagelike molecular structure is consistently obtained. This cagelike molecular structure provides or contributes to the unique character of the defined resinous system.

The catalyzing acid is essential to the reaction of the present invention, and it is essential that the acid be mixed with the formaldehyde before addition of triethanolamine and urea. Although all strong inorganic acids such as hydrochloric acid, sulfuric acid, and phosphoric acid are operable, phosphoric acid is definitely preferred. Phosphoric acid as the catalyzing acid not only results in a very rapid, but controllable reaction, it also provides an aqueous resinous solution which has good shelflife and consistency. Further, the resultant product has good fire-retardancy properties.

Although the aqueous resinous system of this invention can be used as such in or as coatings, moldings, adhesives, or the like, a characteristic feature of the resinous system is its compatibility with various accelerators and modifiers to permit the use of the resinous system in diverse applications. More specifically, the resinous system is compatible with bromine. When bromine is added in from 1 to 15 parts per 100 parts of resin, excellent fire retardancy is imparted to the resin permitting its use in the impregnation of papers, textiles, building tiles, and the like, to provide a flame-resistant and flame-retardant product;

the resinous system is compatible with other catalyzing agents including additional amounts of inorganic acids such as phosphoric acid, hydrochloric acid, and sulfuric acid, and also catalysts such as ammonium phosphate and ammonium sulfamate. When these catalysts are added to the resinous system in amounts of from 1 to 10 parts per 100 parts of resin, extremely rapid cure of the resinous system is obtained without adverse influence upon the final product when used as adhesives, protective coatings, or as a fabric impregnate to impart permanent-press and wrinkle-resistant properties to the fabric as well as fire retardancy;

the resinous system is compatible with other chemicals permitting further modification of the system to meet diverse requirements. For example, when from 1 to 10 parts phenol are added to the resinous system, the cure rate of the resinous system is accelerated both at room and elevated temperatures to provide a product having superior adhesive properties and strength;

the resinous system is compatible with conventional fillers, pigments, and lubricants commonly employed in polymer systems such as clays, ground limestone or white gypsum, talc, cellulose, aluminum hydrate with imparts flame-resistant characteristics; chopped glass fibers, asbestos, and other synthetic fibers such as nylon, polyesters, and acrylic fibers; finely divided carbon to impart electrical conductivity to the polymer, titanium oxide pigments, dyes, as well as the conventional mold lubricants such as zinc stearate and the like. Additionally, the resinous system is compatible with highly acid or alkaline fillers, permitting use of the resinous system in various structural components including panelling, tile blocks, and the like. For example, 200 parts "red mud" which is a highly alkaline residue obtained as a by-product when aluminum is extracted from bauxite by the Bayer process, consisting largely of complex sodium aluminum silicates and iron oxide, was admixed with 100 parts of the resin and applied to a panel and cured to provide a decorative and structurally improved panel. Various other materials can be admixed with the resinous system of the present invention to provide unique characteristics.

PREFERRED EMBODIMENT AND ILLUSTRATIVE EXAMPLE

Having described the invention in general terms, a preferred and illustrative embodiment of the invention, as well as examples of the utility of the invention, will be set forth.

230 parts aqueous formaldehyde (37 percent non-volatile) and 23 parts aqueous phosphoric acid (85 percent non-volatile) were mixed together. An exothermic and substantially immediate reaction occurred. 28 parts triethanolamine were added to the formaldehyde/phosphoric acid mixture. The reaction was exothermic and substantially immediate. Thereafter, 70 parts urea were added to the formaldehyde, phosphoric acid, and triethanolamine reaction product to obtain an aqueous resinous system having a non-volatile of approximately 58 percent. The entire reaction proceeded without applied heat and was complete in a matter of five minutes, i.e., as rapidly as the materials could be mixed together in the sequence designated. The system was water-clear and relatively viscous. The NMR (nuclear magnetic resonance) curve of the resinous system using tetramethylsilane as an external standard of 0.00 parts per million showed the following: a small broad peak at 3.58; sharp peaks at 3.64 and 3.66; small and broad peaks at 3.86 and 4.30; sharp peaks at 5.02 and 5.16; and a high broad peak at 5.28.

The obtained solution was further diluted with four parts water to one part of resin. The diluted solution was used to wet a 12 inch × 12 inch sample of white cotton broadcloth until doubled the dry weight of the cloth was achieved when the material was passed through squeeze rollers or otherwise squeezed to remove excess solution. The cotton material was dried and folded over upon itself and pressed with a hand iron at 325°F. to provide a creased and smooth finish. The weight of the sample was recorded and thereafter the sample washed in a conventional wash machine at about 140°F. with a common detergent and spun dry. The sample was again weighed. Upon completion of 10 wash cycles, it was found that the fabric retained permanent-press characteristics with only slight wrinkling and that 95 percent of the resin remained in the cloth, demonstrating its favorable permanent-press and wash-and-wear characteristics.

To further show the utility of the resinous composition, ten grams aqueous phosphoric acid (85 percent non-volatile) were added to 100 grams of the resin solution and thoroughly mixed. The solution obtained was applied to a wood panel as a thin coating with a paint brush, and the wood panel cured at 250°F. for ten minutes. The coating on the wood panel was uniform, without indication of blistering or the like, and was completely clear, only emphasizing the natural grain of the wood. The wood panel was placed in a water bath maintained at room temperature for a period of 8 hours with only part of the panel submerged. The wood panel was withdrawn from the water bath and permitted to dry. After drying, there was no visible effect of the water upon the resin coating. The submerged and unsubmerged portions of the panel were identical. However, where the wood had not been coated, a distinct water line was noted.

The aforesaid description and the examples illustrate the principle of the present invention. It is to be appreciated, however, that various changes and modifications can be made as will be apparent to one skilled in the art. For example, rather than reacting the reactants in the exact sequence and order stated, a pre-condensate can be made of formaldehyde, triethanolamine, and catalyzing acid by mixing the aforesaid materials together. Thereafter the pre-condensate is reacted with urea. As another example, the triethanolamine can be replaced with modifying compounds containing groups reactive with formaldehyde and urea such as other polyamines such as diethanolamine, or polyhydric alcohols such as ethylene glycol, glycerol, pentaerythritol, and the like. Additionally, the formaldehyde can be replaced with acetaldehyde or other mono-, di-, or polyaldehydes. As a still further modification, the triethanolamine can be omitted entirely to provide a three-component system, i.e., the reaction product of formaldehyde, catalyzing acid, and urea, reacted in the sequence stated. All of these modifications will provide useful products. None, however, show the same magnitude of improvement over the prior art as do the reactants of the preferred embodiment in the described method. It has been found, however, that enhanced results over the disclosed methods can be obtained for certain applications if heat is applied in the reaction of the catalyzing acid and formaldehyde, and at the time of the reaction of the formaldehyde-catalyzing acid and triethanolamine, and at the time the urea is added. The heating and/or the use of pressure provides high clarity and strength.

It is claimed:

1. A process of producing an aqueous resinous system comprising (1) admixing aqueous formaldehyde and an inorganic catalyzing acid to obtain an exothermic and substantially immediate reaction; (2) adding triethanolamine to said reaction mixture of (1) to obtain an exothermic and substantially immediate reaction; and (3) adding urea to the reaction mixture of (2) to obtain a viscous aqueous resinous solution, said formaldehyde being present in an amount of 30 moles, said catalyzing acid being present in an amount of 2 moles, said triethanolamine being present in an amount of 2 moles, and said urea being present in an amount of 12 moles, it being permissible to have a variation of no greater than 15 percent in said molar amounts.

2. The process of claim 1 wherein the catalyzing acid is phosphoric acid.

3. A resinous composition comprising the reaction product obtained by the sequential addition and reaction of 30 moles formaldehyde, 2 moles catalyzing acid, 2 moles triethanolamine, and 12 moles urea.

4. The resinous composition of claim 3 wherein the catalyzing acid is phosphoric acid.

5. The resinous composition of claim 4 wherein the molar amounts of formaldehyde, catalyzing acid, triethanolamine, and urea vary by up to 15 percent.

* * * * *